US 8,321,797 B2

Nov. 27, 2012

(12) United States Patent
Perkins (10) Patent No.: US 8,321,797 B2
(45) Date of Patent: Nov. 27, 2012

(54) IMMERSIVE VISUALIZATION CENTER FOR CREATING AND DESIGNING A "TOTAL DESIGN SIMULATION" AND FOR IMPROVED RELATIONSHIP MANAGEMENT AND MARKET RESEARCH

(75) Inventor: Cheryl A. Perkins, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 759 days.

(21) Appl. No.: 11/618,769

(22) Filed: Dec. 30, 2006

(65) Prior Publication Data

US 2008/0162262 A1 Jul. 3, 2008

(51) Int. Cl.
*G06Q 30/00* (2012.01)
(52) U.S. Cl. ........................................ 715/757; 715/771
(58) Field of Classification Search .................. 715/757, 715/752–756, 758, 760, 702–703, 708–709, 715/771–773; 707/10
See application file for complete search history.

(56) References Cited

U.S. PATENT DOCUMENTS

| | | | |
|---|---|---|---|
| 5,846,134 A | 12/1998 | Latypov | |
| 5,848,399 A | 12/1998 | Burke | |
| 6,026,376 A | 2/2000 | Kenney | |
| 6,026,377 A | 2/2000 | Burke | |
| 6,053,738 A | 4/2000 | Ivey, Jr. | |
| 6,256,043 B1 | 7/2001 | Aho et al. | |
| 6,304,855 B1 | 10/2001 | Burke | |
| 6,381,583 B1 | 4/2002 | Kenney | |
| 6,425,764 B1 * | 7/2002 | Lamson | ........................ 434/236 |
| 6,580,441 B2 | 6/2003 | Schileru-Key | |
| 6,697,538 B1 * | 2/2004 | Angenent et al. | ............. 382/285 |
| 6,702,767 B1 | 3/2004 | Douglas et al. | |
| 6,783,084 B1 | 8/2004 | Nelson | |
| 6,859,784 B1 | 2/2005 | van Duyne et al. | |
| 6,907,310 B2 | 6/2005 | Gardner et al. | |
| 6,970,812 B2 | 11/2005 | Kamachi et al. | |
| 7,143,023 B2 * | 11/2006 | Katz et al. | ........................ 703/16 |
| 2001/0014868 A1 | 8/2001 | Herz et al. | |
| 2002/0188460 A1 | 12/2002 | Resh | |
| 2003/0091967 A1 * | 5/2003 | Chosack et al. | ............. 434/262 |
| 2003/0154092 A1 | 8/2003 | Bouron et al. | |
| 2004/0012593 A1 | 1/2004 | Lanciault | |

(Continued)

FOREIGN PATENT DOCUMENTS

EP 0665039 8/1995

(Continued)

OTHER PUBLICATIONS

Robert Pennington, "Signs of Marketing in Virtual Reality", Journal of Interactive Advertising, Fall 2001, 20 pgs., vol. 2, No. 1, American Academy of Advertising, US.

(Continued)

*Primary Examiner* — Steven Sax
(74) *Attorney, Agent, or Firm* — Armstrong Teasdale LLP (57) ABSTRACT

Embodiments of the invention include methods, apparatuses, and articles of manufacture for generating and using virtual reality simulations to conduct market research and related activities. An immersive visualization center may be used to manage relationships with customers, choosers, shoppers, and users. The visualization center may allow customers (or other relevant parties) to interact with virtual representations of products or solutions in a virtual reality environment appropriate for the product. The immersive visualization center may also include a physical mock-up of the environment and or products simulated by the virtual reality simulation.

27 Claims, 5 Drawing Sheets

U.S. PATENT DOCUMENTS

| | | | |
|---|---|---|---|
| 2004/0015424 A1 | 1/2004 | Cash et al. | |
| 2004/0078276 A1 | 4/2004 | Shimogori | |
| 2004/0083143 A1 | 4/2004 | Rodger | |
| 2005/0177463 A1 | 8/2005 | Crutchfield et al. | |
| 2005/0253840 A1 | 11/2005 | Kwon | |
| 2005/0261980 A1 | 11/2005 | Hadi | |
| 2007/0043632 A1* | 2/2007 | Abelow | 705/27 |
| 2007/0122781 A1* | 5/2007 | Dobransky | 434/236 |
| 2008/0065468 A1* | 3/2008 | Berg et al. | 705/10 |
| 2008/0125218 A1* | 5/2008 | Collins | 463/31 |
| 2008/0162261 A1 | 7/2008 | Velazquez et al. | |
| 2008/0163054 A1 | 7/2008 | Pieper et al. | |

FOREIGN PATENT DOCUMENTS

| | | |
|---|---|---|
| EP | 1168215 | 1/2002 |
| EP | 1550971 | 7/2005 |
| JP | 11039364 | 2/1999 |
| WO | 0169364 | 9/2001 |
| WO | 0205215 | 1/2002 |

OTHER PUBLICATIONS

Unknown, PCT International Search Report and Written Opinion regarding PCT/US2007/055209, Jun. 13, 2008, 9 pgs., International Searching Authority, Netherlands.

Sara Stabelfeldt et al., Designing Diapers and Sizing Schemes with a Fit Mapping Tool, Jun. 16, 2004, 13 pgs., Kimberly-Clark Corporation, Neenah, WI.

Shen C. Shiau, Office action mailed from the USPTO in U.S. Appl. No. 11/618,764, Jan. 26, 2009, 53 pgs., US.

G. C. Burdea and P. Coiffet, Virtual Reality Technology, 2nd. Ed., Wiley Science, 2003, pp. 285-314 and 349-362.

J. D. Lindsey, et al., "The Historical Use of Computerized Tools for Marketing and Market Research: A Brief Survey", Published at IP.com, Dec. 27, 2001.

www.sarcos.com/telerobotics.html.

Thalmann N. M., et al., Modeling of Bodies and Clothes for Virtual Environments, Cyberworlds, 2004 International Conference on Tokyo, Japan, Nov. 18, 2004, pp. 201-208, Section 7, XP010750812, IEEE, USA.

Office Action mailed Apr. 28, 2011 for U.S. Appl. No. 11/618,767; 9 pages.

Office Action mailed Sep. 17, 2010 for U.S. Appl. No. 11/618,767; 15 pages.

Office Action mailed Feb. 4, 2011 for U.S. Appl. No. 11/618,764; 20 pages.

Office Action mailed Aug. 16, 2010 for U.S. Appl. No. 11/618,764; 20 pages.

Office Action mailed Apr. 13, 2010 for U.S. Appl. No. 11/618,764; 19 pages.

Office Action mailed Jul. 9, 2009 for U.S. Appl. No. 11/618,764; 18 pages.

International Search Report and Written Opinion for PCT/IB07/55301 dated May 1, 2012; 15 pages.

* cited by examiner

IMMERSIVE VISUALIZATION CENTER FOR
CREATING AND DESIGNING A "TOTAL
DESIGN SIMULATION" AND FOR
IMPROVED RELATIONSHIP MANAGEMENT
AND MARKET RESEARCH

CROSS-REFERENCE TO RELATED
APPLICATIONS

This application is related to U.S. patent application Ser. No. 11/638,947, titled: "The Use of Physical and Virtual Composite Prototypes to Reduce Product Development Cycle Time," filed on Dec. 14, 2006, and incorporated by reference herein in its entirety. This application is also related to U.S. patent application Ser. No. 11/618,764 titled: "Virtual Reality System Including Personalized Virtual Environments," filed on Dec. 30, 2006, and incorporated by reference herein in its entirety.

BACKGROUND OF THE INVENTION

1. Field of the Invention

Embodiments of the present invention generally relate to virtual reality simulations, and more particularly to an immersive visualization center for creating and designing a "total design simulation" and for improved relationship management and market research.

2. Description of the Related Art

The manufacture and marketing of consumer products is highly competitive, and product manufacturers spend enormous sums of money on product and product packaging design. Traditionally, product design has been an iterative process where a manufacturer selects a particular design, constructs a prototype, and then tests the prototype to determine whether it has a set of desired functional characteristics. Often, the testing is done by consumers (or other relevant product users) in product trials or studies. One problem with this approach is that it involves long cycle times from idea to market, even for small or simple changes to a product design. For example, a typical consumer product research study may involve, after identifying a relevant test cohort, sending out products for use by the study participants, and subsequently bringing in the participants to discuss their experience with the product in a focus group, or contacting participants individually to obtain responses to detailed questionnaires.

In addition to being expensive and time consuming, these typical consumer research studies have numerous flaws. First, it is difficult, if not impossible to know in advance which questions need to be asked. Thus, the questionnaires tend to include a voluminous number of questions. Unfortunately, relevant details often get lost in the minutiae of this approach. Second, even when participants give what they believe to be an accurate response, people often interact with a product in ways they do not realize, making it difficult, if not impossible for an individual to convey some information about their experience with a product in a questionnaire or focus group. Thus, these approaches tend to focus on the functional aspects of a product (e.g., depending on the product, participants may relate observations of functional product performance such as "it worked," "it didn't work," "it leaked," "it cleaned," "it moisturized," etc.). This focus on functional attributes, while important, fails to convey any emotional or visceral reactions a consumer has with a product.

Similarly, these approaches are unable to capture nonverbal information that can provide deeper insights into consumer and shopper reactions. For example, nonverbal information can include how a shopper handles a product (e.g., how it is picked up, what portions of the package draw the attention of the eyes, how the product is handled, what parts of the packaging are covered when it is picked up, where the eyes focus, what is read and not read, how the product is opened or used, and how the consumer reacts physiologically, etc.)

Another approach to conducting product design and market research is to use virtual reality simulations, and virtual reality tools have been developed to assist in visualizing real spaces. For example, virtual shopping tools are available to simulate consumer activity and to conduct market research based on consumer interaction with a computer simulation of a shopping (or other relevant) environment. However, the virtual reality applications developed or published to date have tended to focus on consumer purchase decisions. For example, several computer-assisted simulation and virtual reality tools have been developed to represent shopping experiences simulating products on shelves of a retail store. Such a simulation may be configured to allow a participant to select a product, and the focus of market research has been on factors that may influence a consumer's (or other relevant product chooser) product selection decisions.

If the simulations are effective at capturing aspects of product design that may influence consumer purchasing decisions and product performance, then the simulations may provide a product manufacturer with a powerful tool for designing products and product packaging, as well as for demonstrating to retailers (or other customers) how design choices may be optimized to increase sales of a given product, or how a given product design choice may benefit the customer. Unfortunately, however, virtual reality simulations created using the methodology described above, and the research data obtained therefrom, have not provided the desired results. Further, it is often difficult to validate product design choices using only data obtained through a virtual reality simulations.

As the foregoing illustrates, to improve the design and optimization of products as well as marketing approaches, there remains a need for improved techniques of conducting market research and product design, and more specifically, for an immersive visualization center for creating and designing a "total design simulation" and for improved relationship management and market research.

SUMMARY OF THE INVENTION

One embodiment of the invention includes a computer-assisted method of conducting market research using a virtual reality simulation. The method includes generating a virtual reality simulation based on a first data collection and a second data collection, where the first data collection describes a product to simulate in the virtual reality simulation and the second data collection describes an environment to simulate in the virtual reality simulation. The method also includes presenting the virtual reality simulation to a simulation participant on a virtual reality display platform, monitoring the simulation participant interacting with the simulation of the product and the environment provided by the virtual reality simulation, and presenting the simulation participant with a physical mock-up environment, wherein the physical mock-up environment corresponds to the environment presented in the virtual reality simulation. The method also includes monitoring the simulation participant interacting with a product prototype in the physical mockup environment, where the product prototype corresponds to the product included in the virtual reality simulation.

Another embodiment of the invention includes a computer-readable storage medium containing a program configured to generate a virtual reality simulation used to facilitate market research. The program including instructions for generating a virtual reality simulation based on a first data collection and a second data collection, where the first data collection describes a product to simulate in the virtual reality simulation and the second data collection describes an environment to simulate in the virtual reality simulation. The program also includes instructions for presenting the virtual reality simulation to a simulation participant on a virtual reality display platform, monitoring the simulation participant interacting with the simulation of the product and the environment provided by the virtual reality simulation, and monitoring the simulation participant interacting with a product prototype in a physical mockup environment. The physical mock-up environment corresponds to the environment presented in the virtual reality simulation, and the product prototype corresponds to the product included in the virtual reality simulation.

Another embodiment includes a system providing an immersive virtual reality center used for conducting market research. The system may generally include a virtual reality application configured to generate a virtual reality simulation based on a first data collection and a second data collection, where the first data collection describes a product to simulate in the virtual reality simulation and the second data collection describes an environment to simulate in the virtual reality simulation. The system also includes a virtual reality display platform configured to present a simulation participant with the virtual reality simulation, and a configurable physical mock-up environment, wherein the physical mock-up environment is configured to correspond to the environment simulated by the virtual reality simulation and to allow the simulation participant to interact with a product prototype corresponding to the product included in the virtual reality simulation.

Another embodiment of the invention includes a method for a product manufacturer to manage a relationship with a retailer selling one or more products manufactured by the product manufacturer. The method generally includes generating a virtual reality simulation based on a first data collection and a second data collection, where the first data collection describes a product sold by the retailer to simulate in the virtual reality simulation and the second data collection describes an store layout associated with the retailer to simulate in the virtual reality simulation. The method also includes presenting the virtual reality simulation to the retailer on a virtual reality display platform, and configuring a physical mock-up environment corresponding to the environment simulated by the virtual reality simulation and allowing the retailer to interact with a product prototype corresponding to the product included in the virtual reality simulation.

Another embodiment of the invention includes a computer-assisted method of conducting market research using a virtual reality simulation. The method generally includes generating a first virtual reality simulation based on a first data collection and a second data collection, where the first data collection describes a product to simulate in the virtual reality simulation and the second data collection describes an environment to simulate in the virtual reality simulation. The method also includes generating a second virtual reality simulation, based on a modification to the first data collection or the second data collection, where the modification corresponds to an alternative environment or an alternative product configuration to include in the virtual second virtual reality simulation. The method also includes presenting the first virtual reality simulation and second virtual reality simulation to a simulation participant on a virtual reality display platform, soliciting feedback from the simulation participant regarding the first virtual reality simulation and second virtual reality simulation to identify a preferred environment or product configuration, and based on the feedback, configuring a physical mock-up environment to correspond to the preferred environment or product configuration. The method also includes monitoring the simulation participant interacting with the physical mock-up environment to correspond to the preferred environment or product configuration.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention include methods, apparatuses, and articles of manufacture for generating and using virtual reality simulations to conduct market research and related activities. In one embodiment, an immersive visualization center and virtual reality tools are used for managing relationships with customers, choosers, shoppers, and users. The visualization center may allow customers (or other relevant parties) to interact with virtual representations of products or solutions in a virtual reality environment appropriate for the product. For example, a retail consumer may interact with a virtual environment representing a store in order to make product purchasing decisions, or a doctor could interact with a virtual environment representing an operating room to interact with a simulation of a medical device or related product (e.g., a gown or mask). While this occurs, a product manufacturer or product designer may observe the participant interacting with the products in the environment provided by the virtual reality simulation. In particular, the non-functional aspects of the participant's experience with the product in the virtual environment may be observed. That is, the virtual reality simulation may be used to capture the participant's emotional, visceral, or other non-verbal reactions to different product design choices. By extending virtual reality simulations beyond a conventional simulation of a consumer purchase decisions, aspects of product design such as product packaging, product storage and product use can be simulated and evaluated more effectively and more thoroughly than is possible using present systems.

Further, in one embodiment, the immersive visualization center may include a physical mock-up of the environment provided by the virtual reality simulation. For example, the physical mock-up may provide a mock-up of the simulated store shelves presented to the retail customer or a mock-up of the operating room simulated for the doctor. The physical mock-up may include a prototype of products included in the simulation allowing the simulation participant to interact with both virtual and physical versions of the product. The store layout and/or product prototype may be based on the participant's experience with the virtual version of the product. By modeling both a physical and virtual environment, product designers, manufacturers, etc., may rapidly obtain high-quality information used to make critical product design choices. Furthermore, a product manufacturer may be able to present a customer (or other product chooser) with a persuasive simulation of the performance characteristics of that manufacturer's products. Thus, the immersive visualization center may greatly enhance the efficiency of business negotiations, of information flow between partners, of customer relationship management, and the development of market research results.

In a particular embodiment, the immersive visualization center may be mobile, allowing the tools to be brought to different locations, and may also be networked with remote virtual reality devices to bring together many partners and consumers for on-the-fly testing of hypotheses and evaluation of proposed product solutions, store layouts, marketing approaches, etc. Further, as product design is frequently an iterative process, changes made to product design after one round of virtual reality simulations may be shown in subsequent rounds much more rapidly than is possible using conventional product design methodologies. For example, the participant may cycle from the virtual reality simulation to the physical mockup to test a given product through an evolution of design choices.

Some aspects of the invention are described herein using virtual simulations of a retail environment where simulation participant (i.e., a consumer) interacts with products in simulated retail environment (e.g., a collection of store shelves). However, one of ordinary skill in the art will recognize that the virtual reality tool disclosed herein may be adapted for use with a variety of environments and products. For example, as already stated, the immersive visualization center could allow a doctor to interact with a virtual operating room, along with a corresponding physical mock-up of the operating room. Other applications of the immersive visualization center will be readily apparent to one of ordinary skill in the art.

One embodiment of the invention is implemented as a program product for use with a computer system. The program(s) of the program product defines functions of the embodiments (including the methods described herein) and can be contained on a variety of computer-readable media. Illustrative computer-readable media include, but are not limited to: (i) non-writable storage media on which information is permanently stored (e.g., read-only memory devices within a computer such as CD-ROM or DVD-ROM disks readable by a CD-ROM or DVD-ROM drive); (ii) writable storage media on which alterable information is stored (e.g., floppy disks within a diskette drive, hard-disk drives, or flash memory devices). Other media include communications media through which information is conveyed to a computer, such as through a computer or telephone network, including wireless communications networks. The latter embodiment specifically includes transmitting information to/from the Internet and other networks. Such computer-readable media, when carrying computer-readable instructions that direct the functions of the present invention, represent embodiments of the present invention.

Further, the following description references embodiments of the invention. However, it should be understood that the invention is not limited to any specifically described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
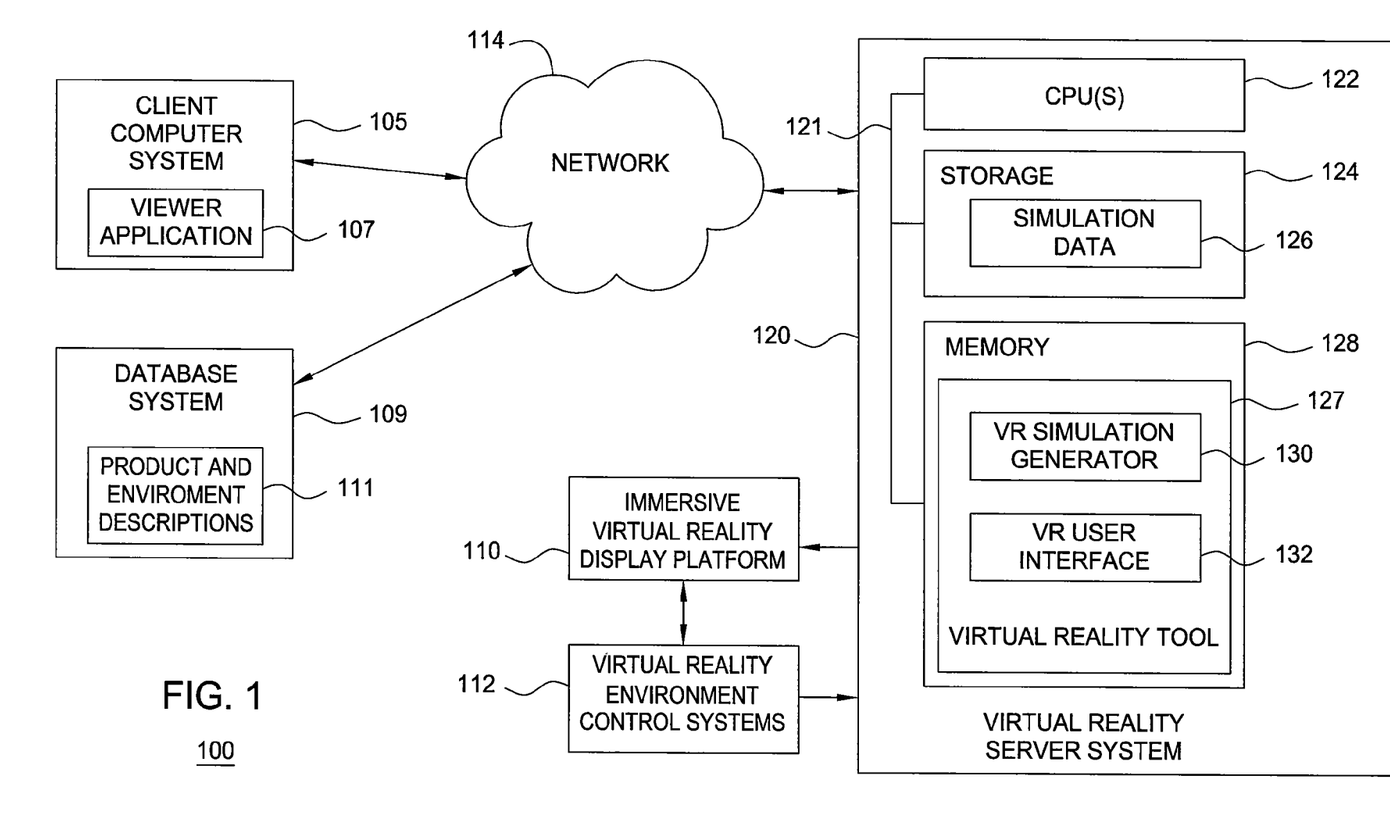
FIG. 1 is a conceptual diagram of a computing environment and virtual reality system, according to one embodiment of the invention.

FIG. 1 is a conceptual diagram of a computing environment and virtual reality system, according to one embodiment of the invention. As shown, computing environment 100 includes a client computer system 105 and a database system 109 in communication with a virtual reality server system 120 over a network 114. The computer systems 105, 109, and 120 illustrated in environment 100 are included to be representative of existing computer systems, e.g., desktop computers, server computers, laptop computers, tablet computers and the like. However, embodiments of the invention are not limited to any particular computing system, application, device, or network architecture and instead, may be adapted to take advantage of new computing systems and platforms as they become available. Additionally, those skilled in the art will recognize that the illustrations of computer systems 105, 111, and 120 are simplified to highlight aspects of the present invention and that computing systems and networks typically include a variety of components not shown in FIG. 1.

As shown, server system 120 includes one or more CPUs 122, storage 124, and memory 128 connected by a bus 121. CPU 102 is a programmable logic device that executes the instructions, logic and mathematical processing performed in executing user applications (e.g., a virtual reality tool 127). Storage 124 stores application programs and data for use by sever system 120. Common storage devices 124 include hard-disk drives, flash memory devices, optical media and the like. Network 114 represents any kind of data communications network, including both wired and wireless networks. Accordingly, network 114 is representative of both local and wide area networks, including the Internet.

In one embodiment, virtual reality tool 127 may be configured to record the actions of a simulation participant interacting with a virtual environment provided by a virtual reality display platform 110. For example, a product designer or market researcher may interact with a server system 120 using client computer system 105 and a viewer application 107. Viewer application 107 may be a web-browser configured to display multi-media content such as audio and video streams.

Virtual Reality Environment Control systems 112 may be used to monitor and control visual, auditory, and other sensory aspects of the virtual environment presented to a simulation participant. The simulation participant may interact with a virtual environment presented on a virtual reality display platform 110 using a variety of virtual reality user interaction devices 112. Additionally, as is well-known, the processing activity of server system 120 may be coordinated by an operating system (not shown). Widely available operating systems include the Windows® operating system and distributions of the Linux® operating system, among others.

Database system 109 may be used to store product and environment descriptions 111 used by virtual reality tool 127 to generate a given virtual environment. For example, product and environment descriptions 111 in database system 109 may include descriptions of a store layout used by a retailer, including both "in-use" and "testing" layouts of the store. This information may include photographs, videos, CAD drawings, etc. Database system 109 may also store data related to products to include in a virtual reality simulation. Of course, the particular contents of database 109 and product and environment descriptions 111 may be selected based on the environment and/or products to be simulated. More generally, database 109 may be used to store any data used to create the virtual environment presented to a simulation participant.

As shown, memory 128 of server system 120 includes virtual reality tool 127. Virtual reality tool 127 may be a software application configured to generate the virtual environment presented to a user on virtual reality display platform 110. As shown, virtual reality tool 127 includes a simulation generator 130 and a virtual reality user interface 132. User interface 132 provides an interface to configure virtual reality simulation generator 130 to create a particular simulation. Simulation data 126 includes any product and environment descriptions 111 included in a given simulation.

For example, in the context of a virtual reality simulation of a retail environment, simulation data 126 may specify a store layout and product selection to include in the simulation. Simulation generator 130 may be configured to create the virtual shopping environment from simulation data 126. In such a case, the virtual reality simulation may be presented to a market researcher, product designer, and/or product manufacturer to present a simulation of the product in a shopping environment, such as would be found in a retail store. Alternatively, the virtual reality simulation may be presented to a simulation participant who interacts with the simulation while being observed and/or recorded by market researchers, product designers, product manufacturers, etc., for the purpose of performing market research.

Figure 2A:
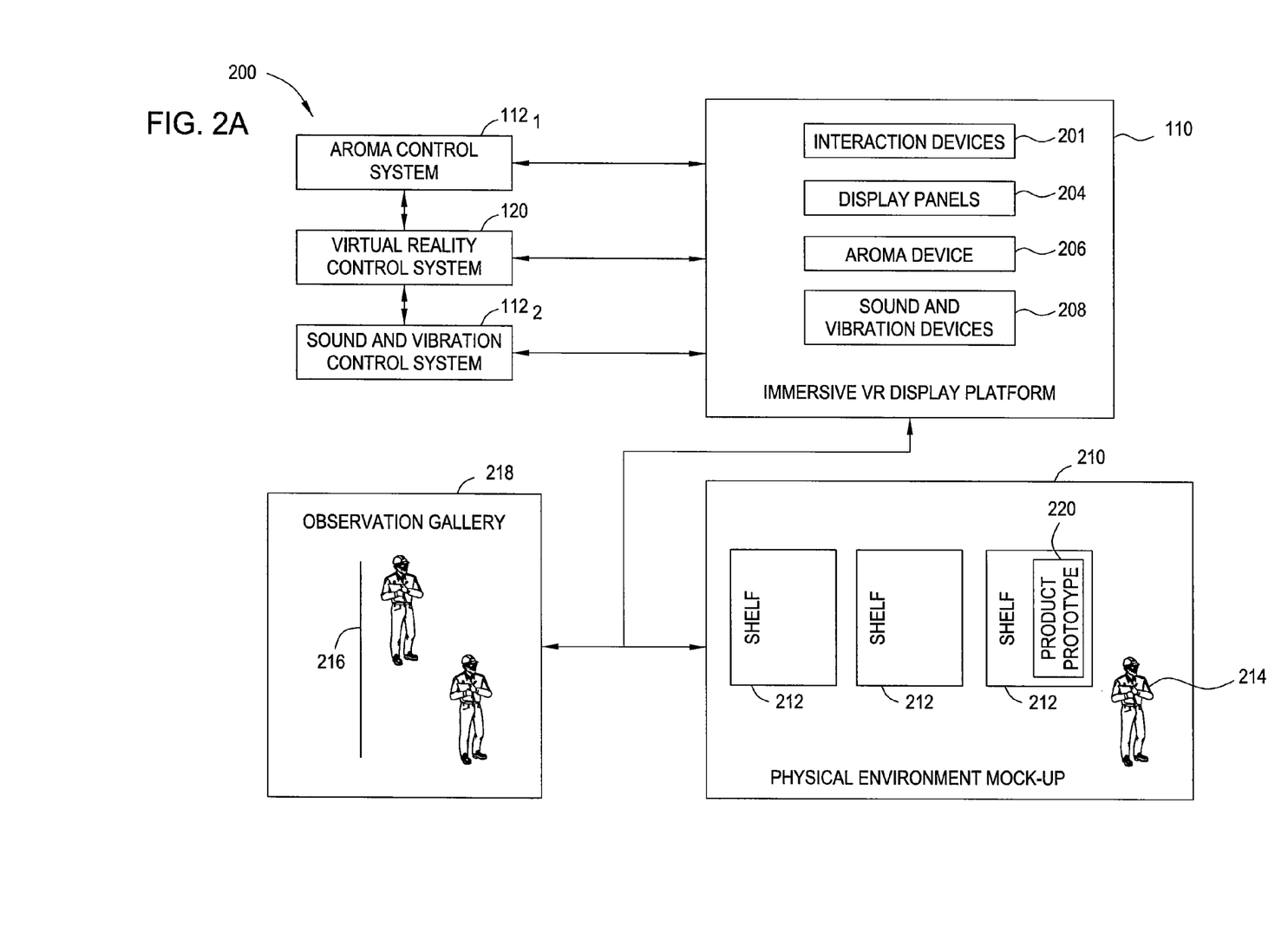
FIG. 2A is a conceptual diagram of an immersive virtual reality visualization center, according to one embodiment of the invention.

FIG. 2A is a conceptual diagram of an immersive visualization center 200, according to one embodiment of the invention. As shown, visualization center 200 includes an immersive virtual reality display platform 110, control systems 112, virtual reality control system 120, observation gallery 218 and a physical environment mock up 210.

Immersive virtual reality display platform 110 includes a number of components used to provide a simulation participant with an immersive virtual environment. Illustratively, the components include interaction devices 201 allowing a participant to interact with the virtual environment and display panels 204 used to provide present the participant with a visualization of the virtual environment. Additionally, display platform 110 may include an aroma device 206 and/or sound and vibration devices 208 used to enhance the quality of a virtual reality simulation. The aroma device 206 may be configured to introduce smells or odors into the virtual environment, either on queue, or in response to the participant interacting with one of interaction devices 201. Similarly, sound and vibration devices 208 may play prerecorded audio, or may generate sounds and or motion, vibration, etc., in response to the participant's interaction with one of interaction devices 201.

In one embodiment, these (and other) sensory aspects of the simulation may be controlled by virtual reality sever system 120 and control systems 112. As shown, control systems 112 include an aroma control system $112_1$ (used to control aroma device 206) and sound and vibration control system $112_2$ (used to control sound and vibration device 208). One of ordinary skill in the art will recognize that although shown as separate components, control system 112 may be software applications running on server system 120, either as independent processes or part of a single, comprehensive virtual reality tool.

These multi-sensory aspects of a virtual reality simulation may allow a participant to experience not only a realistic environment related to the product, but experience various aspects of interaction with, or use of, the product, including experiencing the benefits of the product. For example, in evaluating a face mask offering odor-control functionality, immersive visualization center 200 can provide a user (e.g., a surgeon, nurse, etc.) with a virtual experience highlighting the actual benefit of a new face-mask design. In such a case, a virtual operating room may be used to provide a realistic model of an operating room in use, and aroma device 206 may be configured to introduce the actual smells that are typically present in such an environment. For example, in settings where ozone may be generated during a procedure, detectable but harmless quantities of ozone or of similar odors may be introduced into the virtual operating environment. The participant may then physically don a face mask being evaluated to directly experience its odor removal capabilities. Alternatively, the performance characteristics of the face mask may be demonstrated by changing the amount of aroma introduced to indicate the effect of odor reduction through use of the face mask.

Similarly, aroma device 206 may used to demonstrate the benefits and performance of many other products, such as diapers, cleaning products, wipes, etc. For example, in a virtual representation of a dirty kitchen, a participant may use a virtual representation of a wipe to clean a surface and observe the effectiveness of the wipe in removing dirt. In such a case, display panels 204 may be configured to present a before and after presentation of the counter surface, based on the participant interacting with the virtual environment. Further, the display may also provide information not normally visible to the human eye, such as the presence of bacteria or other substances. For example, the VR representation of the kitchen may have an added green glow displayed in places of high bacteria population to provide means for visualizing microbial population densities. Thus, the effectiveness of a wipe or other cleaning agent in controlling or killing microbes may then be visualized.

Physical environment mock-up 210 may be used to provide a simulation participant with a physical environment corresponding to one presented on virtual reality display platform 110. In the illustration provided in FIG. 2A, environment mock-up 210 includes a mock-up for a portion of a retail environment, such that customers or other users (e.g., representatives of a retail store) may experience both a virtual environment as well as a physical prototype of what has been shown through the virtual reality environment. As shown, the mockup 210 is configured to mimic the Layout of a retail store having shelves 212, and a product prototype 220, corresponding to a product simulated in a virtual reality simulation. In one embodiment, the rapid prototyping systems of Steve Cook et al. described in U.S. patent application Ser. No. 11/638,947, titled "The Use of Physical and Virtual Composite Prototypes to Reduce Product Development Cycle Time," filed on Dec. 14, 2006, maybe used to create rapid prototypes of a product design. As disclosed in the Ser. No. 11/638,947 application, a consumer may make selections for options of components of a product in virtual space, and then can see physical prototypes made according to their selections, allowing higher quality marketing research and more rapid product development decisions to be made.

The combination of virtual and physical prototypes enhances the ability to evaluate proposed changes in product solutions, layouts, graphics, lighting, packaging, or other aspects of product marketing. Thus, visualization center 200 enables new levels of experimentation with feedback as alternatives in products, services, marketing approaches, and so forth may be explored in real time in both a virtual environment and in a corresponding and with prototypes or mock-ups.

Feedback may be obtained from a participant regarding product performance. Feedback may be obtained regarding the participant's experience in the virtual reality environment provided by immersive display platform 110 as well as her experience in physical environment mock-up 210. Participant feedback can be verbal, i.e., a question-and-answer session following a simulation, but may also be based on user actions and choices, as well as physiological and other non-verbal responses. When used to assist customers (e.g., a retail seller) understand the benefits of a particular product design or proposed marketing plan or strategy, the immersive visualization center can allow customers to rapidly explore multiple product design and/or store layout scenarios, in both the virtual and physical environments. For example, a product manufacturer could demonstrate to a retail partner how a product (e.g., an antiviral tissue) could be used in several environments such as a school, an office, and a hospital room. The multiple environments could be rapidly displayed and the participant could observe or interact with objects in these environments or observe avatars doing the same.

Further, a retail customer could not only observe a 3-D depiction of a proposed new planogram for an aisle in the retail seller's store, but could also be provided with visualized data from actual consumer studies showing hot spots on the shelf, customer purchase patterns, etc., or could observe interactions of live customers who are networked to the immersive visualization center and observing the shelf space in their own virtual reality environment. Retailers could observe the purchase rate, the pickup rate, consumer eye response and visual attractors, etc., in real time as changes are made to packaging, shelf layout, planograms, etc. Observation gallery 218 may allow these (or other relevant) parties 216 to observe and/or interact with a participant 214 and/or the virtual or physical environment provided by immersive visualization center 200.

Figure 2B:
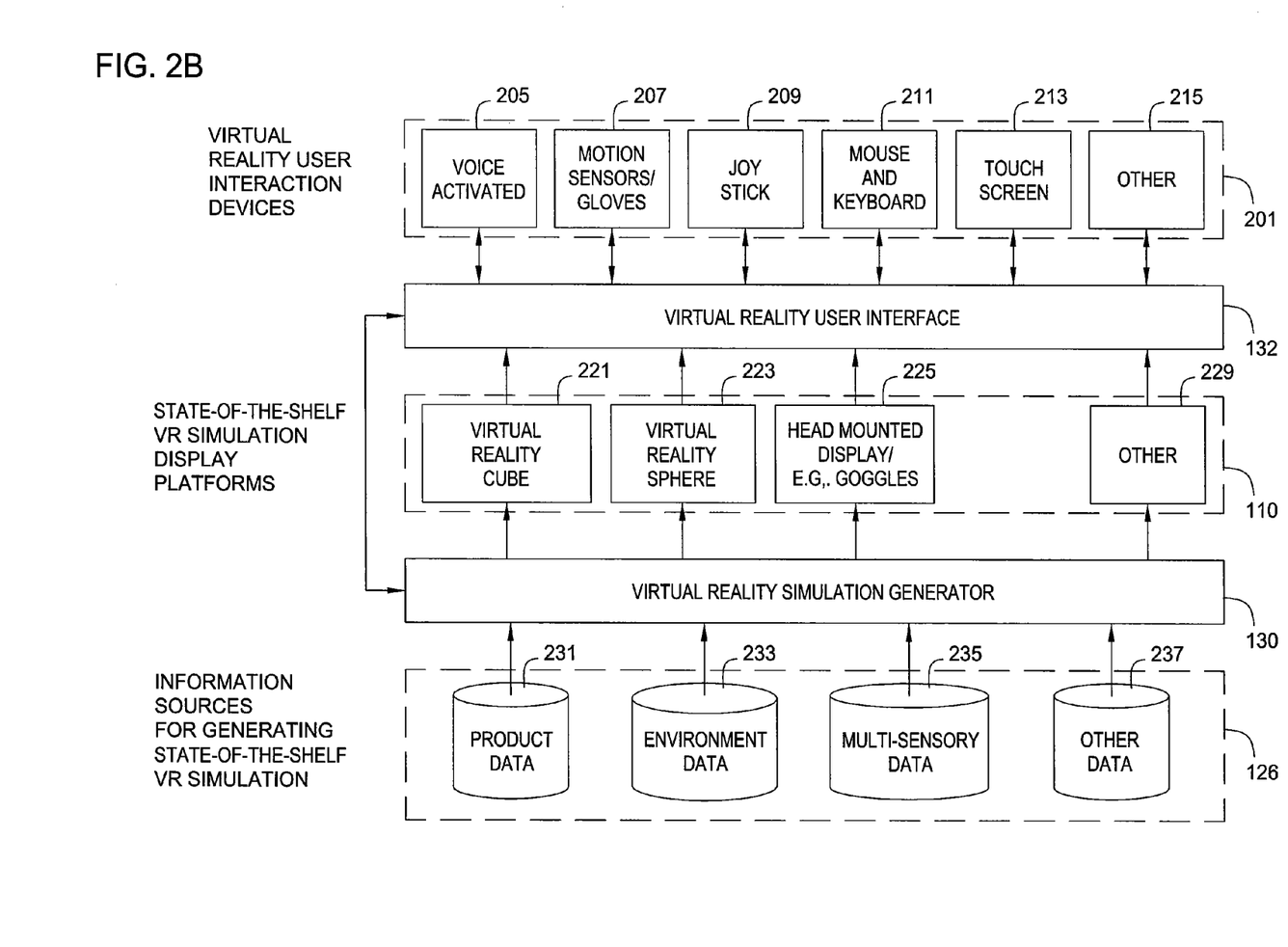
FIG. 2B is a conceptual diagram further illustrating the virtual reality system shown in FIGS. 1 and 2A, according to one embodiment of the invention.

FIG. 2B is a conceptual diagram further illustrating components immersive virtual reality display platform 110 shown in FIGS. 1 and 2A, according to one embodiment of the invention. More specifically, FIG. 2B illustrates a variety of immersive virtual reality display platforms 110, user interaction devices 201, and product and environment descriptions 111 used to generate and present a simulation participant with a virtual reality simulation. Interaction devices 201 may allow a simulation participant to interact with elements of the virtual reality simulation. As shown, interaction devices 201 may include voice activated devices 205, motion sensing devices 207 worn by a user, e.g., a set of motion sensing gloves or goggles, a joystick device 209, a mouse and keyboard device 211, a touch screen device 213, or other user interface device 215. Of course, depending on how a virtual reality simulation is presented to a simulation participant, the input devices 112 may be tailored to suit the needs of a particular case.

Motion sensing gloves 207 (and other motion tracing devices) may record the movements of a participant during a simulation. For example, sensors worn by the participant could record hand, arm, leg, body and/or head movements of the participant. Subsequently, the recorded movements may be used to generate representation of the participant in a video sequence for review by a market researcher or product designer. Such a sequence may provide a view of the simulation either through the eyes of the participant or from other camera angles focused on the participant.

Illustratively, virtual reality display platforms 110 include a virtual reality cube or "CAVE Automatic Virtual Environment" (CAVE) environment 221, a virtual reality sphere 223, a head-mounted display 225 worn by a viewer or simulation participant, and other user virtual reality display platforms 229.

As is known, a VR cube environment 221 provides an immersive virtual environment where a user interacts with a virtual reality system inside a room where projectors are directed to, e.g., three, four, five, or six of the walls of a cube. The images may be in stereo requiring stereo shutter glasses to be worn. Presenting a simulation using virtual reality cube 221 may provide the participant with a fully immersive visualization where the screens of the cube provide participant's entire visual sensory experience. Similarly, a head mounted display 225, such as a virtual reality helmet or 3D goggles may provide an immersive virtual environment, where display screens are incorporated into the goggles. The visual presentation may be responsive to movements of the participant. For example, as the participant turns her head from side to side, the display presented on the googols may change accordingly.

Alternatively, virtual reality sphere 223 may be used to provide an immersive virtual reality environment. A virtual reality sphere 223 provides a large sphere that allows an individual to enter and move in any direction. The movement of the sphere 223 may be monitored by virtual realty server system 120 and used to create an environment that responds to the actions of the participant. For example, the participant may "walk" through a virtual store. As the participant moves trough the virtual aisles within the virtual reality sphere, the visual experience provided by the headset corresponds to the participant's movement. Of course, embodiments of the invention are not limited to these virtual reality display platforms, and may be adapted for use with other existing platforms as well as new ones that become available.

As stated, virtual reality simulation generator 130 may be configured to generate a simulation presented on one of display platforms 110 based on a set of simulation data 126. FIG. 2B illustrates a number of exemplary data sources that may be used to specify simulation data 126 for a given virtual reality simulation. As shown, simulation data may include product data 231, environment data 233, multi-sensory data 235, and other data 237.

Product data 231 includes any data related to the product being evaluated and/or simulated for a virtual reality simulation. For example, product data 231 may include the product itself, product features, product packaging, and the like. More specifically, product data 231 may specify aspects of a product such as product design, materials, aesthetics, ergonomic aspects, colors, shapes, scents, textures, sounds, user perceptions of usefulness and/or performance, price, branding, perceptions of value, package count, package design, purchase intent, sensory perceptions, among others, to use in generating a virtual reality simulation. Thus, embodiments of the invention provide for a virtual reality simulation that simulates aspects of product use and storage, including simulation a consumer's experiences in storing a product, opening a package containing a product, removing the product from a package, preparing and using the product, and disposing of the product and/or packaging. Environment data 233 may describe the appearance, behavior, and other characteristics of the environment to include in a virtual reality simulation. For example, environment data 233 may specify the size, and layout of a retail store.

In addition to data 231 and 233, in one embodiment, a virtual reality simulation may be augmented using multi-sensory data 235. Multi-sensory data 235 may be used to simulate sights, sounds, tactile responses, or even tastes to personalize the virtual reality environment for the simulation participant. For example, a package of cleaning wipes may be virtually represented such that a simulation participant interacting with a virtual home environment can open the virtual package and hear the sound of the product as the packaging is opened. Taking this example one step further, the participant may also be exposed to a scent characteristic of the product as part of the simulation. If the simulation were the use of a cleaning product in the participants' home, the simulation may also include scents associated with the home such as the smells of a diaper pail. In such a case, the scents of both the home and the cleaning product may interact, allowing the participant to observe the effectiveness of the cleaning product within the virtual environment. Including a variety of aspects of the simulated product performance such as, sounds, smells, and actions resulting from a participants' interaction with a virtual product may improve the quality of a virtual reality simulation.

Other simulation data 237 includes any other information used to generate or personalize a virtual reality simulation for a simulation participant. For example, other simulation data 237 may include data related to the height of the participant, and adjust the appearance of the virtual shelves of a retail store accordingly. Or a consumer may provide additional information used to personalize a virtual reality simulation. For example, the simulation could be configured to simulate the appearance of a consumer's home (or other living space) based on photographs (or other items) provided by the consumer. Examples of personalizing virtual reality environments are disclosed in a related United States patent application having U.S. Ser. No. 11/618,764, titled: "Virtual Reality System Including Personalized Virtual Environments," which is herein incorporated by reference in its entirety.

Figure 3:
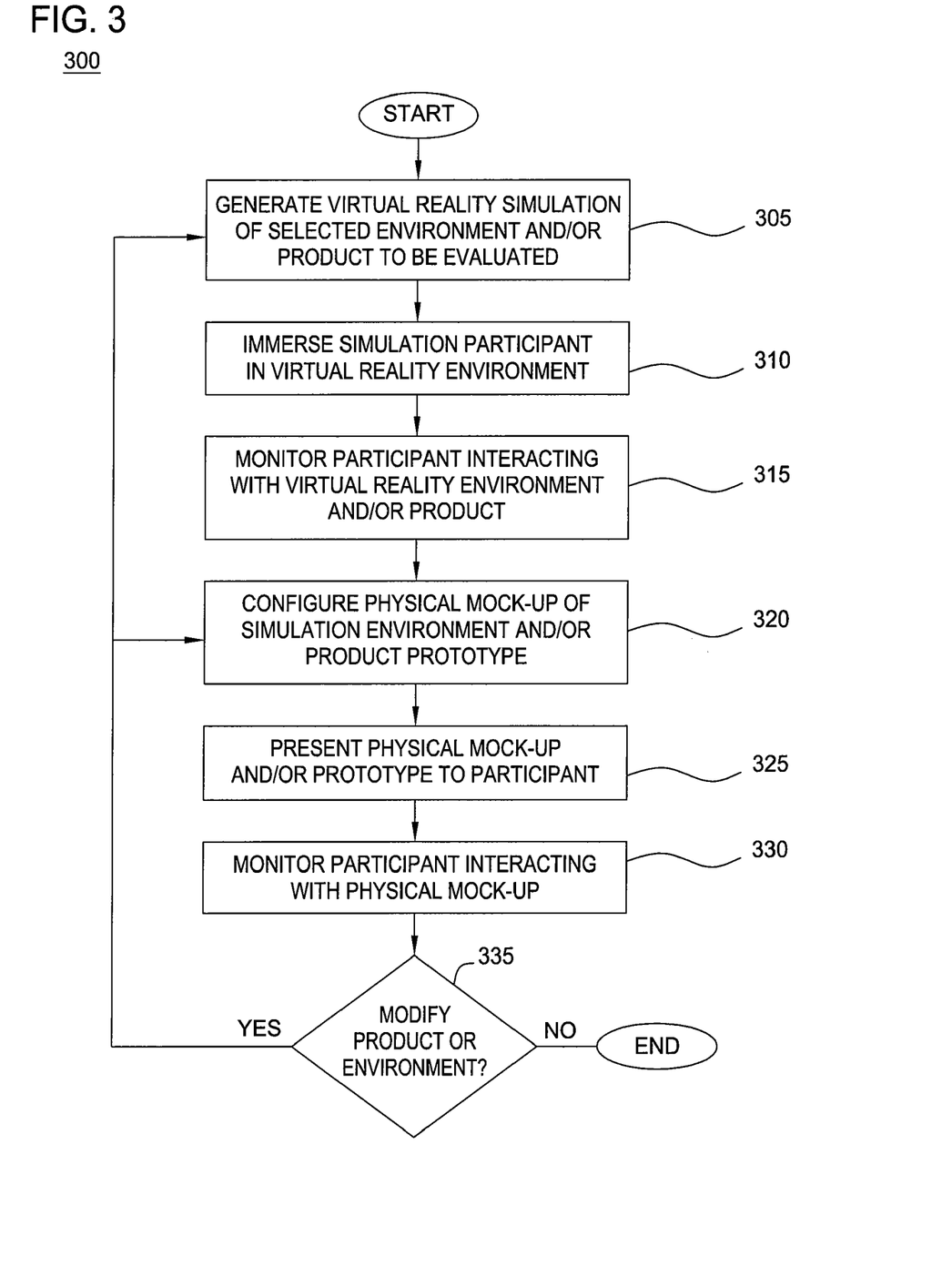
FIG. 3 is a flow diagram illustrating a method for generating a virtual reality simulation, according to one embodiment of the invention.

FIG. 3 is a flow diagram illustrating a method 300 for generating a virtual reality simulation, according to one embodiment of the invention. Method 300 may be used to present a participant with both a virtual and physical representation of a product being used in a preferred environment. In one embodiment, the immersive visualization center described above in conjunction with FIGS. 1-2 may be used. However, one of ordinary skill in the art will recognize that when used herein, examples of specific equipment, software, products, and provided for illustrative purposes, and other types of these items may be used without departing from the scope of the present invention.

As shown, the method 300 begins at step 305 where a virtual reality simulation of a selected environment and or product is generated for a simulation participant. In different cases, the simulation participant may be a retail customer, shopper, product end-user, chooser, manufacturer, or researcher, among others. At step 310, the simulation participant is immersed in the virtual reality environment and may begin interacting with the simulation. At step 315 the simulation participant is monitored interacting with the virtual environment. In one embodiment, this may include a "live" presentation of the participant's actions, but may also include the recording the actions of the participant for subsequent review. Also, as part of the simulation, the participant may be presented with different choices for configuring a product. At step 320, a physical mock-up of a preferred environment associated with the product may be configured and/or a physical product prototype may be generated. The physical mock-up and/or product prototype may correspond to the virtual environment presented in the simulation. Further, the product prototype may be based on design choices made by the participant as part of the simulation.

At step 325, the participant may interact with the physical mock-up and/or product prototype. At step 330, the simulation participant is monitored interacting with the physical mock-up and/or product prototype. At step 335, based on the participant's responses to the physical and/or virtual products and environments, additional modifications may be made. In such a case, the steps of method 300 may be repeated for a new configuration of the product and/or environment. Of course, it is not necessary that both the virtual and physical environments may be simulated every time a modification is made. For example, multiple virtual reality simulations may occur before generating a corresponding physical mock-up and/or product prototype, or vice versa. In other words, the participant may be involved in multiple iterations of virtual and/or physical product design, allowing different design choices to be evaluated, or for a product design to evolve through multiple versions.

Figure 4:
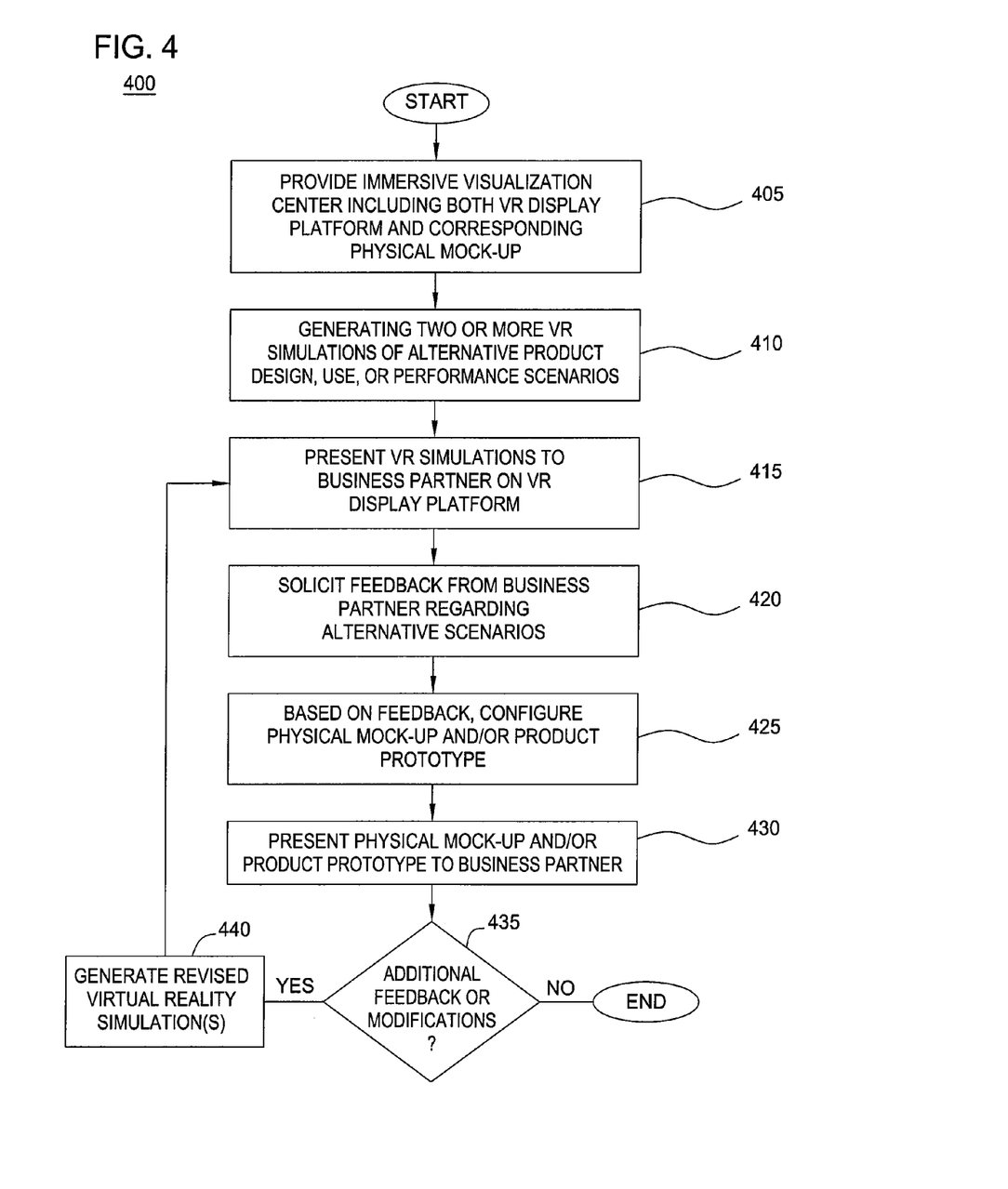
FIG. 4 is a flow diagram illustrating a method for evaluating product design alternatives using a virtual reality simulation, according to one embodiment of the invention.

FIG. 4 is a flow diagram illustrating a method 400 for evaluating product design alternatives using a virtual reality simulation, according to one embodiment of the invention. As shown the method 400 begins at step 405 where a product manufacturer (or other relevant party) provides a selected business partner with access to an immersive visualization center that includes both a virtual reality display platform and a physical mock-up environment. At step 410, the product manufacturer may use the visualization center to generate multiple virtual reality simulations configured to simulate alternate product design, use, and/or performance scenarios. At step 415, the virtual reality simulations may be presented to the business partner on the virtual reality display platform included with the immersive visualization center.

At step 420, the product manufacturer may solicit feedback from the business partner regarding the alternative scenarios presented in the virtual reality simulations. Similarly, in a particular embodiment, multiple classes of users may participate in experiencing the VR simulations, such as one group of people representing shoppers, choosers, or product end-users and another group representing retail sellers (e.g., business leaders or decision makers from a retail store). In such a case, each group may be presented with the multiple simulation scenarios and feedback from both groups is obtained. Another possibility includes having the second group observe behaviors from the first group as they interact with a proposed business model, product solution, change to a store environment, etc.

At step 425, based on the feedback provided by simulation participant (or participants) a physical mockup and/or product prototype may be configured. At step 430, the simulation participant is presented with the physical mock-up and/or product prototype. At step 435, additional modifications to the product or environment may be selected. If so, at step 440, a revised virtual reality simulation may be generated and the method returns to step 415 where steps 415-435 may be repeated.

As described herein, embodiments of the invention may be used to create virtual reality simulations used for market research and related activities, where the virtual reality simulations include both a virtual reality component and a corresponding physical mock-up of an environment or product prototype. Advantageously, by combining both virtual and physical simulations, aspects of product design and use can be simulated and evaluated more effectively and more thoroughly than is possible using present systems.

While the foregoing is directed to embodiments of the present invention, other and further embodiments of the invention may be devised without departing from the basic scope thereof, and the scope thereof is determined by the claims that follow.

What is claimed is:

1. A computer-assisted method of evaluating aesthetics of product design and product packaging using a virtual reality simulation, comprising:
    generating a virtual reality simulation based on a first data collection and a second data collection, wherein the first data collection describes a product to simulate in the virtual reality simulation and the second data collection describes an environment to simulate in the virtual reality simulation;
    presenting the virtual reality simulation to a simulation participant on a virtual reality display platform;
    receiving data corresponding to a response of the simulation participant interacting with the simulation of the product and the environment provided by the virtual reality simulation to evaluate aesthetics of the product design and packaging of the product;
    presenting the simulation participant that interacted with the simulation of the product and the environment provided by the virtual reality simulation with a physical mock-up of the environment presented in the virtual reality simulation;
    receiving data corresponding to a response of the simulation participant interacting with a prototype of the product presented in the virtual reality simulation and packaging of the prototype in the physical mockup of the environment to evaluate the aesthetics of the product design and the packaging of the product;
    comparing the received data corresponding to a response of the simulation participant interacting with the simulation of the product and the environment provided by the virtual reality simulation with the received data corresponding to a response of the simulation participant interacting with the prototype of the product and packaging of the prototype of the product in the physical mockup of the environment provided by the virtual reality simulation; and
    providing results of the comparing.

2. The method of claim 1, wherein the simulated environment comprises a medical practice environment.

3. The method of claim 1, wherein the virtual reality simulation includes a multi-sensory aspect that simulates at least one of a scent characteristic of the simulated product or environment or a sound characteristic of the simulated product or environment.

4. The method of claim 1, wherein the virtual reality display platform comprises one of a virtual reality cube, virtual reality sphere, or virtual reality goggles worn by the simulation participant.

5. The method of claim 1, wherein receiving data corresponding to a response of the simulation participant comprises receiving data corresponding to a visceral reaction or an emotional reaction of the simulation participant to the simulated product or the product prototype.

6. The method of claim 1, wherein the environment simulated by the virtual reality simulation presents the simulation participant with at least one aspect of the simulated environment not visible by the simulation participant.

7. A non-transitory computer-readable storage medium containing a program configured to generate a virtual reality simulation used to evaluate aesthetics of product design and product packaging, the program including instructions for performing an operation, comprising:
    generating a virtual reality simulation based on a first data collection and a second data collection, wherein the first data collection describes a product to simulate in the virtual reality simulation and the second data collection describes an environment to simulate in the virtual reality simulation;
    presenting the virtual reality simulation to a simulation participant on a virtual reality display platform;
    receiving data corresponding to a response of the simulation participant interacting with the simulation of the product and the environment provided by the virtual reality simulation to evaluate the aesthetics of the product design and packaging of the product;
    receiving data corresponding to a response of the simulation participant that interacted with the simulation of the product and the environment provided by the virtual reality simulation interacting with a prototype of the product presented in the virtual reality simulation and packaging of the prototype of the product in a physical mockup of the environment presented in the virtual reality simulation to evaluate the aesthetics of the product design and the packaging of the product;
    comparing the received data corresponding to the response of the simulation participant interacting with the simulation of the product and the environment provided by the virtual reality simulation with the received data corresponding to the response of the simulation participant interacting with the prototype of the product and packaging of the prototype of the product in the physical mockup of the environment presented in the virtual reality simulation; and
    providing results of the comparing.

8. The non-transitory computer-readable medium of claim 7, wherein the simulated environment comprises a retail shopping environment.

9. The non-transitory computer-readable medium of claim 7, wherein the simulated environment comprises a medical practice environment.

10. The non-transitory computer-readable medium of claim 7, wherein the virtual reality simulation includes a multi-sensory aspect that simulates at least one of a scent characteristic of the simulated product or environment or a sound characteristic of the simulated product or environment in the virtual reality simulation.

11. The non-transitory computer-readable medium of claim 7, wherein the virtual reality display platform comprises one of a virtual reality cube, virtual reality sphere, or virtual reality goggles worn by the simulation participant.

12. The non-transitory computer-readable medium of claim 7, wherein receiving data corresponding to a response of the simulation participant comprises receiving data corresponding to a visceral reaction or an emotional reaction of the simulation participant to the simulation of the product or the prototype of the product.

13. The non-transitory computer-readable medium of claim 7, wherein the environment simulated by the virtual reality simulation presents the simulation participant with at least one aspect of the simulated environment not visible by the simulation participant.

14. A system comprising an immersive virtual reality center used for evaluating aesthetics of product design and product packaging, wherein the system comprises:
  a virtual reality application configured to generate a virtual reality simulation based on a first data collection and a second data collection, wherein the first data collection describes a product to simulate in the virtual reality simulation and the second data collection describes an environment to simulate in the virtual reality simulation;
  a virtual reality display platform configured to present a simulation participant with the virtual reality simulation to evaluate the aesthetics of the product design and packaging of the product;
  a configurable physical mock-up of the environment presented in the virtual reality simulation, wherein the physical mock-up of the environment enables the simulation participant that interacted with the simulation of the product and the environment provided by the virtual reality simulation to interact with a prototype of the product presented in the virtual reality simulation to evaluate the aesthetics of the product design and the packaging of the product and to provide improvements to at least one of the aesthetics of the product design or the packaging of the product based on the evaluation.

15. The system of claim 14, wherein the simulated environment comprises a retail shopping environment.

16. The system of claim 14, wherein the simulated environment comprises a medical practice environment.

17. The system of claim 14, wherein the virtual reality display platform is configured to simulate at least one of a scent characteristic of the simulated product or environment or a sound characteristic of the simulated product or environment.

18. The system of claim 14, wherein the virtual reality display platform comprises one of a virtual reality cube, virtual reality sphere, or virtual reality goggles worn by the simulation participant.

19. The system of claim 14, wherein the virtual reality display platform is further configured to receive data corresponding to a visceral reaction or an emotional reaction of the simulation participant to the simulated product or environment.

20. A method for a product manufacturer to manage a relationship with a retailer selling one or more products manufactured by the product manufacturer, comprising:
  generating a virtual reality simulation based on a first data collection and a second data collection, wherein the first data collection describes a product sold by the retailer to simulate in the virtual reality simulation and the second data collection describes a store layout associated with the retailer to simulate in the virtual reality simulation;
  presenting the virtual reality simulation to the retailer on a virtual reality display platform to evaluate aesthetics of product design and product packaging; and
  configuring a physical mock-up of the environment simulated by the virtual reality simulation and allowing the retailer that interacted with the simulation of the product and the environment provided by the virtual reality simulation to interact with a prototype of the product presented in the virtual reality simulation to evaluate the aesthetics of a product design and a packaging of the product and to provide improvements to at least one of the aesthetics of the product design or the packaging of the product based on the evaluation.

21. A computer-assisted method of evaluating aesthetics of product design and product packaging using a virtual reality simulation, comprising:
  generating a first virtual reality simulation based on a first data collection and a second data collection, wherein the first data collection describes a product to simulate in the virtual reality simulation and the second data collection describes an environment to simulate in the virtual reality simulation;
  generating a second virtual reality simulation, based on a modification to the first data collection or the second data collection, wherein the modification corresponds to an alternative environment or an alternative product configuration to include in the second virtual reality simulation to evaluate the aesthetics of the product design and packing of the product;
  presenting the first virtual reality simulation and second virtual reality simulation to a simulation participant on a virtual reality display platform;
  soliciting feedback from the simulation participant that was presented with the first virtual reality simulation and the second virtual reality simulation regarding the first virtual reality simulation and second virtual reality simulation to identify a preferred environment virtual reality simulation to evaluate the aesthetics of the product design and the packaging of the product;
  based on the feedback, configuring a physical mock-up of the environment and the product simulated in the preferred virtual reality simulation;
  receiving data corresponding to a response of the simulation participant that was presented with the first virtual reality simulation and the second virtual reality simulation interacting with the physical mock-up of the environment and the product simulated in the preferred virtual reality simulation;
  comparing the received data corresponding to a response of the simulation participant interacting with the physical mock-up of the environment and the product simulated in the preferred virtual reality simulation with data corresponding to at least one of the first virtual reality simulation or the second virtual reality simulation; and
  providing results of the comparing.

22. The method of claim 21, wherein each simulated environment comprises a retail shopping environment.

23. The method of claim 21, wherein each simulated environment comprises a medical practice environment.

24. The method of claim 21, wherein each virtual reality simulation includes a multi-sensory aspect that simulates at least one of a scent characteristic of the simulated product or environment or a sound characteristic of the simulated product or environment.

25. The method of claim 21, wherein the virtual reality display platform comprises one of a virtual reality cube, virtual reality sphere, or virtual reality goggles worn by the simulation participant.

26. The method of claim 21, further comprising receiving data corresponding to a response of the simulation participant interacting with at least one of the first virtual reality simulation, the second virtual reality simulation, or the physical mock-up of the environment and the product simulated in the preferred virtual reality simulation.

27. The method of claim 26 wherein receiving data corresponding to a response of the simulation participant comprises receiving data corresponding to a visceral reaction or an emotional reaction of the simulation participant to the simulated product.

* * * * *

UNITED STATES PATENT AND TRADEMARK OFFICE
CERTIFICATE OF CORRECTION

PATENT NO. : 8,321,797 B2
APPLICATION NO. : 11/618769
DATED : November 27, 2012
INVENTOR(S) : Perkins Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 811 days.

Signed and Sealed this
Twenty-sixth Day of August, 2014

Michelle K. Lee
*Deputy Director of the United States Patent and Trademark Office*